US009084494B2

(12) United States Patent
Riach et al.

(10) Patent No.: US 9,084,494 B2
(45) Date of Patent: Jul. 21, 2015

(54) BODY SUPPORT

(71) Applicant: Oakworks, Inc., New Freedom, PA (US)

(72) Inventors: Jeffrey Riach, Cockeysville, MD (US); Pete Edwards, Glen Rock, PA (US); Adam Fodor, Hanover, PA (US)

(73) Assignee: Oakworks, Inc., New Freedom, PA (US)

( * ) Notice: Subject to any disclaimer, the term of this patent is extended or adjusted under 35 U.S.C. 154(b) by 0 days.

(21) Appl. No.: 13/930,380

(22) Filed: Jun. 28, 2013

(65) Prior Publication Data

US 2015/0000041 A1 Jan. 1, 2015

(51) Int. Cl.

| | |
|---|---|
| ***B64D 11/06*** | (2006.01) |
| ***A47C 20/02*** | (2006.01) |
| *A61G 13/12* | (2006.01) |
| *A47G 9/10* | (2006.01) |

(52) U.S. Cl.

CPC ............ *A47C 20/026* (2013.01); *A47G 9/1054* (2013.01); *A47G 9/10* (2013.01); *A61G 13/12* (2013.01); *A61G 13/121* (2013.01)

(58) Field of Classification Search

CPC ... A47C 20/026; A61G 13/12; A61G 13/121; A47G 9/10; A47G 9/1054

USPC ............ 5/644, 622, 652, 637, 638, 640, 643, 5/657, 636; 297/312–313

See application file for complete search history.

(56) References Cited

U.S. PATENT DOCUMENTS

| | | | | |
|---|---|---|---|---|
| 4,711,230 | A * | 12/1987 | Berke et al. | 606/237 |
| 6,023,801 | A * | 2/2000 | Lamm | 5/636 |
| 6,866,340 | B1 * | 3/2005 | Robertshaw | 297/312 |
| 6,910,237 | B2 * | 6/2005 | DiGirolamo | 5/636 |
| 7,089,613 | B2 | 8/2006 | Cohen | |
| 8,439,442 | B2 * | 5/2013 | Highlander et al. | 297/313 |
| 2006/0037142 | A1 | 2/2006 | Binder | |
| 2010/0268121 | A1 * | 10/2010 | Kilborn | 600/587 |

* cited by examiner

*Primary Examiner* — Peter M Cuomo
*Assistant Examiner* — Brittany Wilson
(74) *Attorney, Agent, or Firm* — Barley Snyder

(57) ABSTRACT

A body support is provided for a support structure. The body support includes a top plate, a bottom plate, and plurality of elastic cushions. The top plate includes a first planar surface, while the bottom plate includes a second planar surface facing the first planar surface. The plurality of elastic cushions is disposed between and positioned to engage the top plate and the bottom plate.

24 Claims, 5 Drawing Sheets

BODY SUPPORT

FIELD OF THE INVENTION

The invention relates to a body support and, more particularly, to a body support providing stability, support, and effortless maneuverability in several directions.

BACKGROUND

The human head has a full range of motion through flexion, extension, and rotation to accommodate the human sensory system. However, while in a resting position, such as lying down, the human head requires support to prevent neck strain. Various devices, such as head supports and pillows, have been developed to support the human head. While these known head supports alleviate neck strain, they are often very rigid for a user when lying in the prone or supine positions. The known head supports lack of maneuverability greatly inhibits the human head's full range of movement during positioning and repositioning. As a result, the head's initial positioning becomes uncomfortable over time, and there exists a need for a body support that supports the human head, but allows for some range of motion.

U.S. Pat. No. 7,089,613 discloses a known support device that provides a range of motion for the human head while resting in the prone or supine position. This known support device includes mechanisms that facilitate cushion lateral adjustability relative to the body supported on a table, and springs that maintain placement of the head while resting on the cushion. However, this design provides too much starting friction and limits the desirable wide range of motion for the user's head, especially during repositioning since the disclosed suspension system only allows limited movement.

Therefore, it is desirable to provide a body support that facilitates a greater range of movement for the head while resting in the prone or supine positions and that allows the head to return to a neutral position more easily after movement be performed.

SUMMARY

Accordingly, the present invention has been devised in view of the technical problems described above, and an object of the present invention, among others, is to provide a body support for a support structure. The body support includes a top plate, a bottom plate, and plurality of elastic cushions. The top plate includes a first planar surface, while the bottom plate includes a second planar surface facing the first planar surface. The plurality of elastic cushions is disposed between and positioned to engage the top plate and the bottom plate.

BRIEF DESCRIPTION OF THE DRAWINGS

The invention will now be described by way of example with reference to the accompanying figures of which.

DETAILED DESCRIPTION OF THE EMBODIMENT(S)

Figure 1:
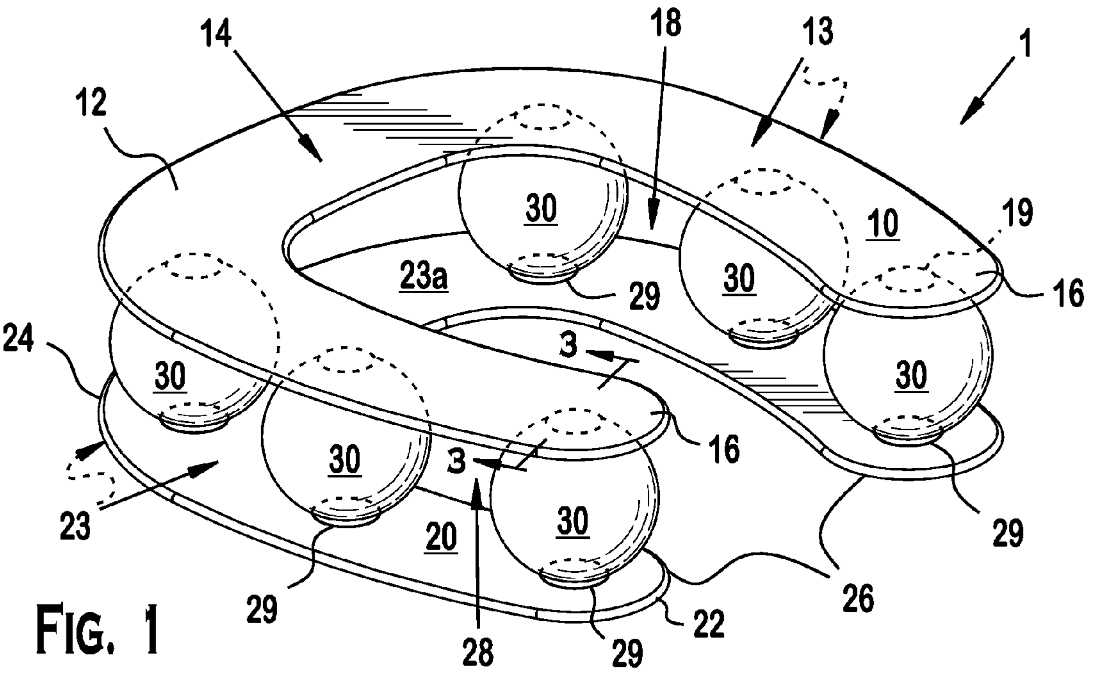
FIG. 1 is a perspective view of a body support according to the invention.

Referring to FIGS. 1-9, a body support 1 according to the invention is shown. An exemplary embodiment of the body support 1 includes the following major components: a top plate 10, a bottom plate 20, a plurality of elastic cushions 30, and a cover 50.

Figure 3:
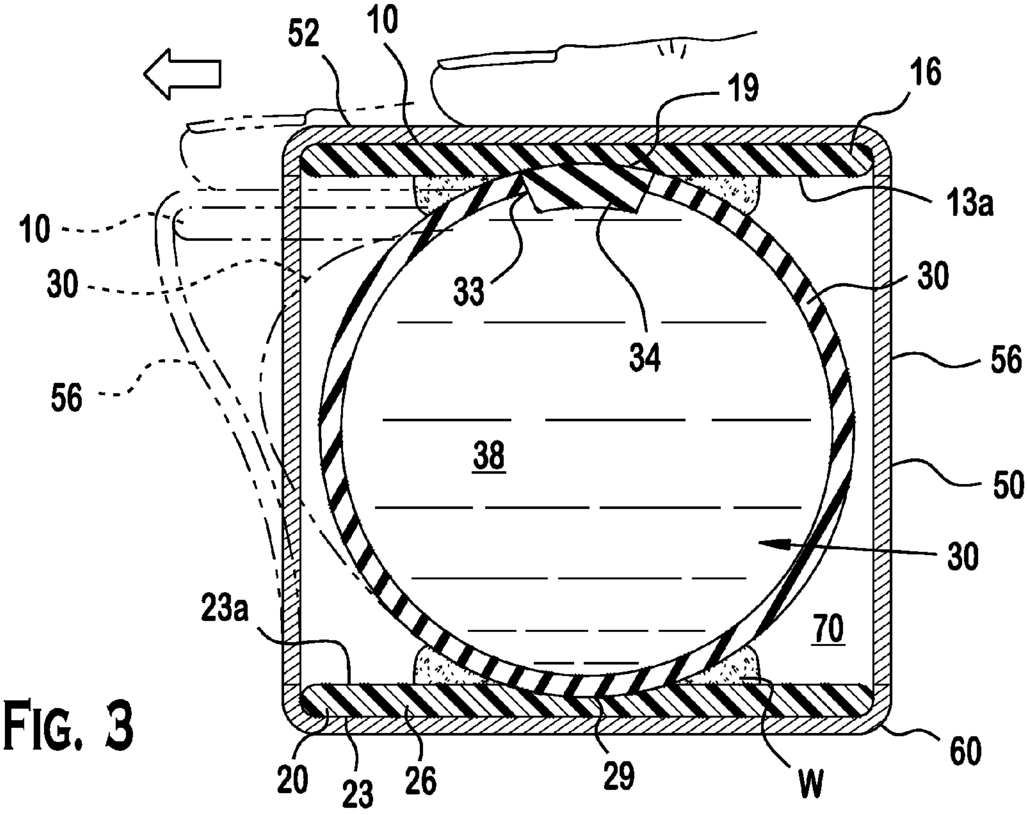
FIG. 3 is a sectional view of the body support according to the invention taken along line 3-3 of FIG. 1, showing movement of the body support using an elastic cushion according to the invention.

First, with reference to FIGS. 1 and 3, the top plate 10 is shown.

The top plate 10 includes a planar member having a body 12 and a first body receiving space 18 passing through the body 12. The body 12 includes a pair of major surfaces 13 positioned opposite one another. The body 12 includes a base 14 and a pair of arms 16 that extend from the base 14. As a result, in the shown embodiment, the body 12 is u-shaped. However, one skilled in the art should appreciate that other configurations are possible and the top plate 10 may take on different shapes and configurations depending on the suitable purpose of the of the body support 1. For instance, if the body support 1 is being used to support an elbow, then the top plate 10 may alternatively be circular.

In the shown embodiment, the top plate 10 includes an opening between the pair of arms 16 and leads into the first body receiving space 18. The first body receiving space 18 is sized to receive a portion of the user's face, but could be designed to receive a portion of another body part, such as an arm, leg, foot, etc.

The top plate 10 is semi-rigid and provides support. The top plate 10 is prepared from a moldable material, such as acrylonitrile butadiene styrene, but could be manufactured from other polymers, such as polypropylene, polyethylene, polyester, polystyrene, polyvinyl chloride, or other known thermoplastics or thermosets. In addition, it is also possible that the top plate 10 will be made from other materials, such as wood, metal, or material composites. In the shown embodiment, the top plate 10 is prepared so that the pair of arms 16 may flex and deflect (i.e. per thickness or type of material used) with respect to the base 14. However, one skilled in the art should appreciate that other embodiments are possible. For instance, the top plate 10 may be thicker or thinner, so that the top plate 10 provides more or less rigidity and support. The desired thickness may also depend on the moldable material being used for the top plate 10.

In the shown embodiment, at least one of the pair of major surfaces 13 is smooth and, in particular, the inner major surface 13*a* is smooth. However, it is possible that both of the pair of major surfaces 13 are roughened to have an irregular surface for supplemental friction. This surface roughening can be performed during molding, post manufacturing, or by adding a rough layer of abrasive material, such as sandpaper.

Additionally, as shown in FIG. 3, a plurality of cushion receiving spaces 19 are disposed along the inner major surface 13*a*. In the embodiment shown, each cushion receiving space 19 is a depression extending into the body 12 from the inner major surface 13*a*. It is possible that each cushion receiving space 19 extends completely there through. Each cushion receiving space 19 is circular shaped around the inner major surface 13*a* and concave, but could be contoured into a variety of different shapes.

Figure 2:
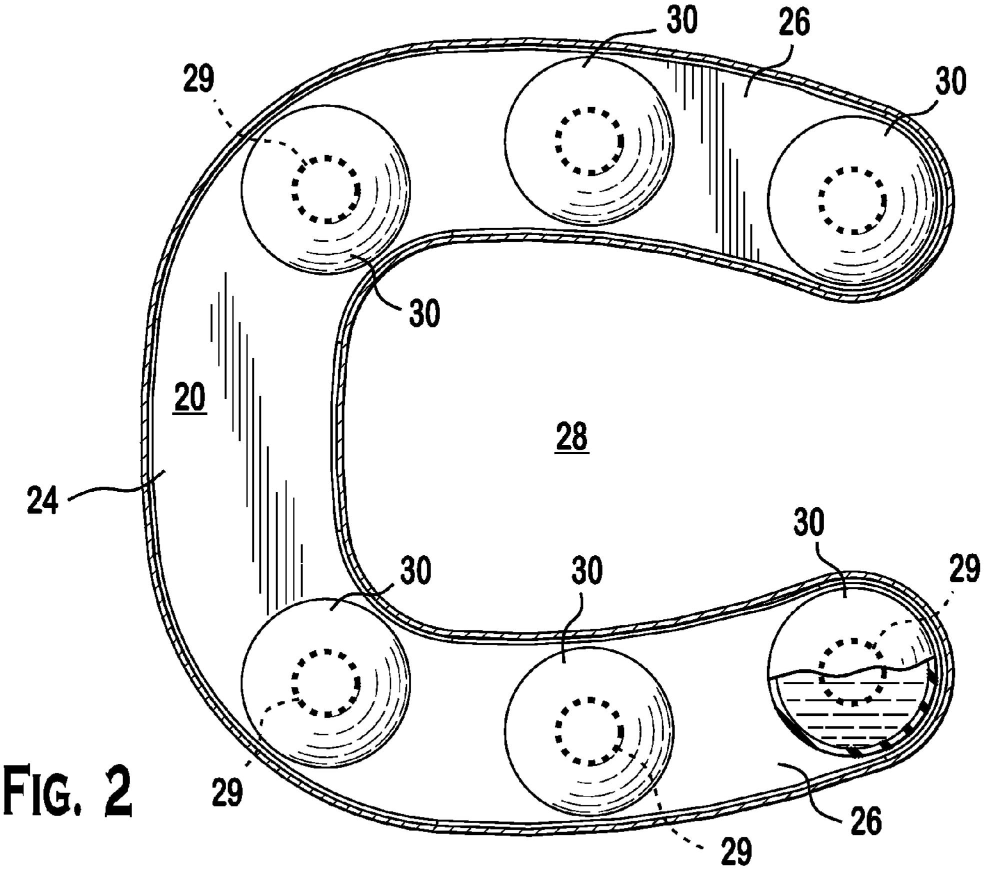
FIG. 2 is a top view of the body support shown in FIG. 1, with a top plate removed from view.

Now with reference to FIGS. 1-3, the bottom plate 20 is shown. Like the top plate 10, the bottom plate 20 includes a planar member having a body 22 and a second body receiving space 28 passing through the body 22. The body 22 includes a pair of major surfaces 23 positioned opposite one another. The body 22 includes a base 24 and a pair of arms 26 that extend from the base 24. As a result, in the shown embodiment, the body 22 is u-shaped. However, one skilled in the art should appreciate that other configurations are possible, like the top plate 10, and the bottom plate 20 may take on different shapes and configurations depending on the suitable purpose of the of the body support 1. Additionally, as shown, the second body receiving space 28 is sized and shaped to match the first body receiving space 18. However, one skilled in the art should appreciate that the bottom plate 20 could be designed without the second body receiving space 28.

In the shown embodiment, the bottom plate 20 includes an opening between the pair of arms 26 and leads into the first body receiving space 28. The first body receiving space 28 is sized to receive a portion of the user's face, but could be designed to receive a portion of another body part, such as an arm, leg, foot, etc.

The bottom plate 20 is also semi-rigid and provides further support. The bottom plate 20 is prepared from a moldable material, such as acrylonitrile butadiene styrene, but could be manufactured from other polymers, such as polypropylene, polyethylene, polyester, polystyrene, polyvinyl chloride, or other known thermoplastics or thermosets. In addition, it is also possible that the bottom plate 20 will be made from other materials, such as wood, metal, or material composites. In the shown embodiment, the bottom plate 20 is prepared so that the pair of arms 26 deflect flex and deflect (i.e. per thickness or type of material used) less than the top support 10 with respect to the base 24. However, one skilled in the art should appreciate that other embodiments are possible. For instance, the bottom plate 20 may thicker or thinner, so that the top plate 20 provides more or less rigidity and support. The desired thickness may also depend on the moldable material being used for the bottom plate 20. The bottom plate 20 could be more or less rigid than the top plate 10.

In the shown embodiment, at least one of the pair of major surfaces 23 is smooth and, in particular, the inner major surface 23*a* is smooth. However, it is possible that both of the pair of major surfaces 23 are roughened to have an irregular surface for supplemental friction. This surface roughening can be performed during molding, post manufacturing, or by adding a rough layer of abrasive material, such as sandpaper.

Additionally, as shown in FIG. 1, a plurality of cushion receiving spaces 29 are disposed along the inner major surface 23*a*. In the embodiment shown, each cushion receiving space 29 is a depression extending into the body 22 from the inner major surface 23*a*. It is possible that each cushion receiving space 29 extends completely there through. Each cushion receiving space 29 is circular shaped around the inner major surface 23 and concave, but could be contoured into a variety of different shapes.

Now with respect to FIGS. 2-5, the plurality of elastic cushions 30 will be discussed.

In an exemplary embodiment of the invention, each elastic cushion 30 includes an outer sidewall 32, an inner cavity 36, and a filler 38. As shown, each elastic cushion 30 is spherical. However, one skilled in the art should appreciate the elastic cushion 30 could be egg-shaped, cubic, or of other geometric shapes (See FIGS. 8 and 9).

The outer sidewall 32 is thin layer of material capable of elastic deformation. In the shown embodiment, the outer sidewall 32 is prepared from a silicone, but otherwise could be prepared from a variety of elastic materials, including elastomers or other materials capable of elastic deformation and capable of recovery. In the exemplary embodiment, the outer sidewall 32 is supple and can easily deform. The outer sidewall 32 may include a tacky surface, which may be provided by roughening the elastic material or disposing another layer of tacky material upon an outer surface of the outer sidewall 32. Furthermore, the elastic material may inherently provide tacky material properties.

Figure 5:
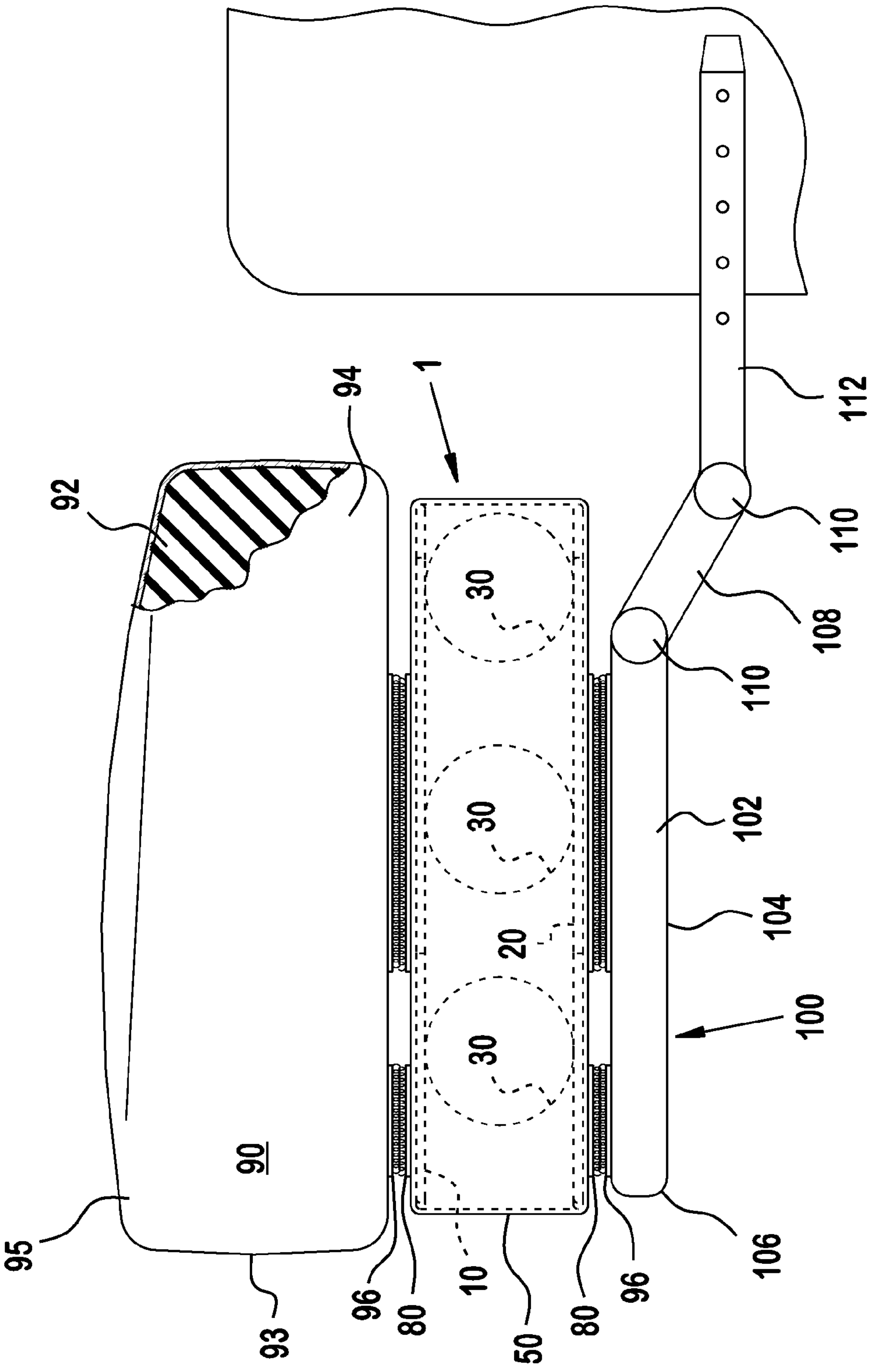
FIG. 5 is a side view of the body support according to the invention being positioned between a body cushion and a body support bracket.

As shown in FIGS. 3 and 5, the outer sidewall 32 may include an opening 33 that leads into the inner cavity 36, and further includes a plug 34 that seals the opening 33. The plug 34 may be made from the same material as the outer sidewall 32 and connected to the outer sidewall 32 using an adhesive or mechanical joint, or using welding techniques.

As shown in FIG. 3, a filler 38 is disposed in the inner cavity 36. The filler 38, in the shown embodiment, is a fluid capable of moving during deformation of the outer sidewall 32. The filler 38 may be water, oil or other known viscous fluids. However, it is also possible that inner cavity 36 is filled by another material, such as a gas or an elastomeric material that is different than the material used for the outer sidewall 32

Additionally, one skilled in the art should appreciate that other embodiments of the elastic cushion 30 are possible. For instance, the elastic cushion 30 may be a wholly solid member.

Now with reference to FIGS. 3, 4, and 6, the cover 50 will be discussed. As shown, in an exemplary embodiment of the invention, the cover 50 may include a top 52, a stretchable side 56, and a bottom 60.

Figure 4:
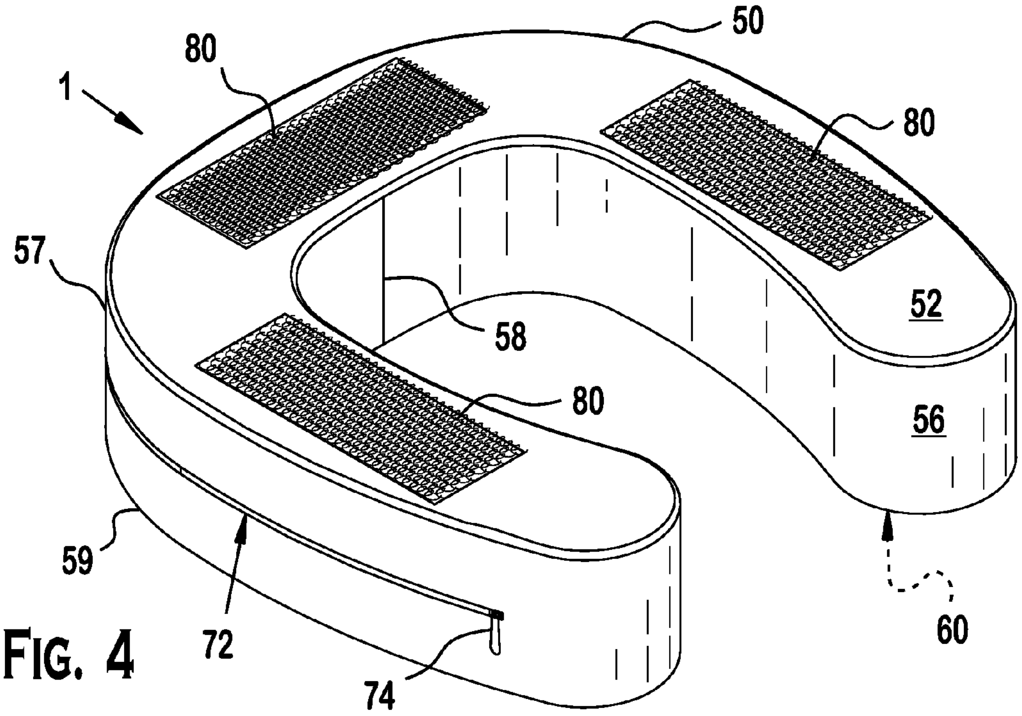
FIG. 4 is a perspective view of a body support according to the invention, shown with a cover.

As shown in FIG. 4, the top 52 is a sheet of flexible material, such as leather or a textile. The top 52 includes a base 54 and a pair of arms 55 extending from the base 54. As shown, the top 52 is u-shaped and matches the shape of the top plate 10 (see also FIGS. 3 and 5).

In the shown embodiment, the stretchable side 56 is a sheet of synthetic fiber having elasticity (seen in FIG. 3). The stretchable side 56 includes a first side 57, a pair of ends 58, and a second side 59. The stretchable side 56 extends from outer edges of the top 52. In the embodiment shown, the first side 57 is fastened to the outer edge of the top 52, while the pair of ends 58 are fastened together; for example, each fastened by sewing. However, one skilled in the art should appreciate that the stretchable side 56 may be fastened to the other elements of the cover 50, using known techniques, such as adhesives, fasteners, or mechanical joints, such as a weld.

Figure 6:
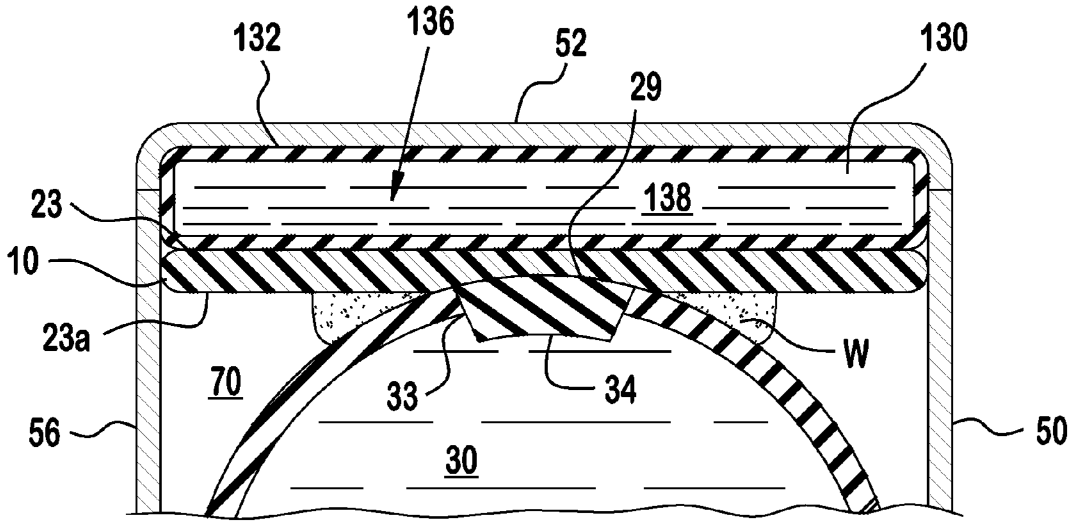
FIG. 6 is sectional view like FIG. 3 showing another body support according to the invention, having a plurality of elastic cushions positioned apart from each other.

As shown in FIGS. 3 and 6, the bottom 60 is sheet of flexible material, such as leather or a textile. The bottom 60 is also u-shaped and matches the shape and dimensions of the bottom plate 20. Accordingly, the bottom 60 includes a base 64 and a pair of arms 66 extending from the base 64. The second side 59 of the stretchable side 56, which is opposite the first side 57, is fastened to an outer edge of the bottom 60, for example, by sewing. However, one skilled in the art should appreciate that the stretchable side 56 may be fastened to the bottom 60 using other known techniques, such as adhesives, fasteners, or mechanical joints.

As shown in FIGS. 3 and 6, the support receiving space 70 is provided when the top 52, stretchable side 56, and the bottom 62 are fastened together. The support receiving space 70 is shaped and dimensioned to receive and surround the top plate 10, bottom plate 20, and a plurality of elastic cushions 30 there between.

As shown in FIG. 4, the cover 50 further includes a support receiving opening 72 and an attachment member 74, such as a zippers, hook and loop fasteners, removable adhesives, slides, buttons, buckles, etc. In the embodiment shown, the support receiving opening 72 is positioned along a surface of the stretchable side 56. However, it is possible in other embodiments, that the support receiving opening 72 will be positioned between the top 52 and the stretchable side 56, or disposed between the bottom 62 and the stretchable side 56. The attachment member 74 provides a temporary seal of the support receiving opening 72.

Additionally, as shown in FIG. 4, a plurality of fasteners 80 may be disposed on the cover 50. For instance, in exemplary embodiment, a fastener 80 may be disposed along surfaces of the top 52 and the bottom 62. In the shown embodiment, the fasteners 80 are hook and loop fasteners. However, other known fasteners could be used, including snaps, latches, removable adhesives, slides, buttons, buckles, etc. In another embodiment of the invention, the fasteners 80 may be disposed on the top plate 10 if a cover 50 is not used.

As shown in FIG. 5, the body support 1 may be integrated with a support structure, such as a massage or examination table, which may require support for a user's head. More particularly, the support structure may generally include a body cushion 90 and a body support bracket 100.

In an exemplary embodiment of the invention, the body cushion 90 includes a pad 92, a casing 95, and a fastener 96. The pad 92 is a u-shaped cushion or pillow, and includes a base 93 and a pair of arms 94 that extend from the base 93 (See FIG. 5). One skilled in the art should appreciate that the body cushion 90 may be configured in various shapes, sizes and contours to provide maximum comfort for different body parts. However, the pad 92 and the top plate 10 will generally have the same shape. The pad 92 may be made of a filler, such as foam, synthetic plastic fibers, feathers, or other viscoelastic polymer. The casing 95 covers the pad 92 and is generally made of leather or a synthetic material, which may be easily cleanable. The body cushion 90 includes a planar bottom surface 98 on which the fastener 96 is disposed.

The fastener 86 is compatible with the fasteners 80, which may be disposed on the cover 50. In the shown embodiment, the fasteners 86 are hook and loop fasteners. However, other known fasteners could be used, including snaps, latches, removable adhesives, slides, buttons, buckles, etc. In another embodiment of the invention, the fasteners 80 may be disposed on the top plate 10 if a cover 50 is not used.

As shown in FIG. 5, an exemplary embodiment of the body support bracket 100 is shown, and includes a support platform 102, a bridge support 108, and a connector 112

The support platform 102 is a planar support made from a rigid material. In an exemplary embodiment of the invention, the support platform 102 matches the bottom plate 20, and has a u-shaped body with a plurality of support arms 104 extending from a base 106. However, other design configurations are possible. In an exemplary embodiment, each bridge support 108 is a pair of rods that extends from the plurality of support arms 104 respectively and may include a plurality of adjustment mechanisms 110 for adjusting the height and angle of the support platform 102 with respect to the connector 112 that extends from the massage table or other piece of furniture.

Now with reference to Figures, an exemplary assembly of the body support 1 according to the invention is discussed.

In the shown embodiment of FIG. 3, the filler 38 is introduced into the inner cavity 36 of each elastic cushion 30. During assembly, the filler 38 is disposed within the inner cavity 36 through the opening 33 of the outer sidewall 32. Once the inner cavity 36 is filled, then the opening is sealed by the plug 34. While this is just an exemplary embodiment of the invention, one skilled in the art should appreciate that elastic cushion 30 could be assembled using other known techniques. For instance, the filler 38 may be over molded by the outer sidewall 32, or the filler 38 may be disposed into the inner cavity 36 using a syringe. In yet another embodiment, it is possible that the filler 38 is a gas, and any known valve system may be used to fill the inner cavity 36 of the elastic cushion 30.

As shown in FIG. 1, the bottom plate 20 is positioned such that the inner major surface **23*a* is facing upward. Each elastic cushion 30 is then positioned to correspond with one of the plurality of cushion receiving spaces 29. One skilled in art should appreciate that inner major surface 23*a* does not require cushion receiving spaces 29, and each elastic cushion 30 can be positioned on a flat or some other irregular inner major surface 29. If the bottom plate 20 does not have cushion receiving spaces 29, then each elastic cushion 30 is spaced apart from each other along the inner major surface 23*a*, generally with three positioned on each side of the bottom plate 20. To provide better stability, each elastic cushion 30 could be secured to the bottom plate 20 by a fastener, a weld, or an adhesive (W). However, one skilled in the art should appreciate that the design is not limited to this, and each elastic cushion 30 may rest on the inner major surface 23*a***.

In the shown embodiment, a pair of elastic cushions 30 are positioned along each arm 26, while one elastic cushion 30 is positioned at opposite ends of the base 24. One skilled in the art should appreciate that multiple designs are possible. For instance, as shown in FIG. 6, an outer elastic cushion 130 is shown and includes an outer sidewall 132, an inner cavity 136, and a filler 138, similar to the elastic cushion 30. However, the outer elastic cushion 130 has a different shape and dimensions than the elastic cushion 30, when combined in a common construction. For instance, the outer elastic cushion 130 may be shaped just like the bottom plate 20 and disposed on an opposite major surface 23 than the inner major surface **23*a*. Additionally, the outer elastic cushion 130 may be positioned on top plate 10 similar to what is shown in FIG. 6**.

Figure 7:
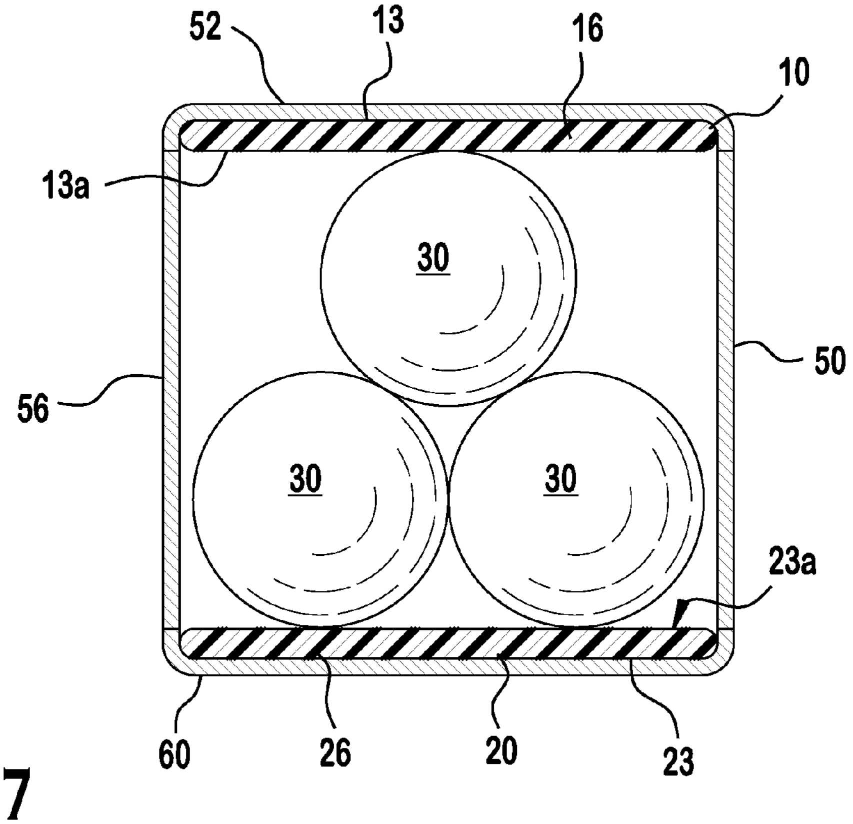
FIG. 7 is a sectional view like FIG. 3 showing another body support according to the invention, having a plurality of elastic cushions disposed next to each other.
Figure 8:
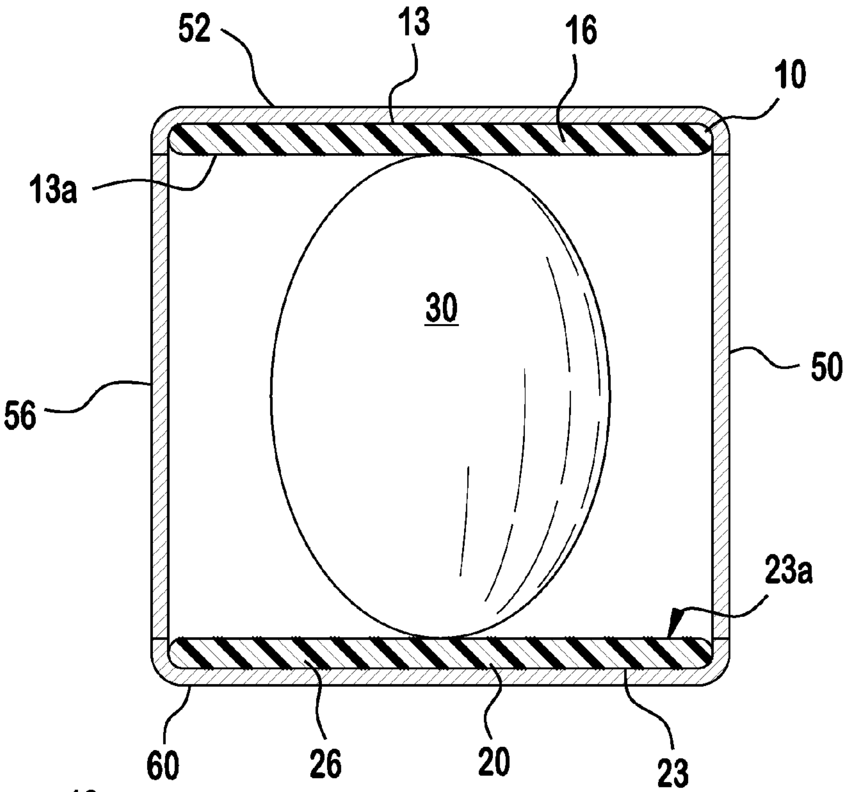
FIG. 8 is a sectional view like FIG. 3 showing another body support according to the invention, having another elastic cushion according to the invention.
Figure 9:
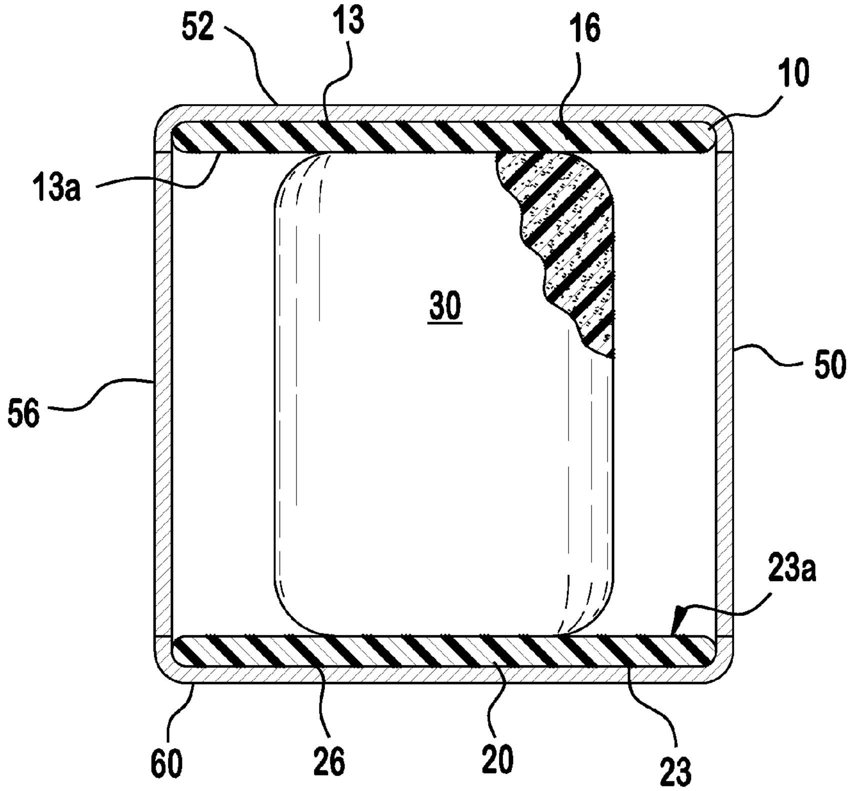
FIG. 9 is a sectional view like FIG. 3 showing another body support according to the invention, having another elastic cushion according to the invention.

As shown in FIG. 7, the plurality of elastic cushions 30 may be stacked and configured in different arrangements, depending on the particular use of the body support 1, and what support and maneuverability is required.

Next, the top plate 10 is positioned on top of the plurality of elastic cushions 30, such that the top plate 10 corresponds with the bottom plate 20. If the top plate 10 includes a plurality of cushion receiving spaces 19, then each elastic cushion 30 is evenly distributed between the top plate 10 and the bottom plate 20.

In another embodiment, the inner major surfaces **13*a*, 23*a* may be roughened such that elastic cushions 30 will maintain position between the top plate 10 and the bottom plate 20 through friction. In addition, the elastic cushion 30 may have a tacky outer sidewall 32, which through friction, may maintain position between the top plate 10 and the bottom plate 20**.

As shown in FIG. 4, the assembled top plate 10, elastic cushions 30, and bottom plate 20 may be positioned in the support receiving space 70 of the cover 50 (see also FIG. 3). As assembled, the top plate 10, elastic cushions 30, and bottom pate 20 is be positioned into the support receiving space 70 through the support receiving opening 72. The top plate 10, elastic cushions 30, and bottom pate 20 may then be secured within the cover 50 using the attachment member 74 that seals the support receiving opening 72.

As shown in FIG. 5, the body support 1 may be integrated into the support structure, such as a massage or examination table, which may include the body cushion 90 and the body support bracket 100. Accordingly, the body support 1 would be positioned between the body cushion 90 and the body support bracket 100. In the shown embodiment, the fasteners 80, 96 are introduced with each other to secure the body support 1 between the body cushion 90 and the body support bracket 100. However, one skilled in the art should appreciate that the body support 1 could be positioned on various support surfaces, including a portable support or fixtures, such a table.

Now with reference to FIGS. 3 and 5, an exemplary use of the support body 1 will be described.

A user might lie on a table T (i.e. massage or examination table) in the prone position, such that the user's face is positionable in the body cushion 90. As shown in FIG. 5, the body support 1 is secured between the body cushion 90 and the body support bracket 100, and the body cushion 90 can be adjustably positioned to effectively support the user's head. This is performed by adjusting the body support bracket 100 relative to an angle, height, and distance between the table (i.e. using the adjustment mechanisms 110 and connector 112).

As shown in FIG. 3, the elastic cushions 30 are very flexible and offer little resistance to deflection. The elastic cushions 30 are positioned to offer equal bilateral support. As discussed above, this can be done using different combinations of the elements discussed above. For instance, the number of elastic cushion 30, as well the shape and size can be varied. Furthermore, the viscosity of the filler 38 could be varied to change the speed of the relative motion of the top and bottom plates 10, 20, thereby dampening movement.

The top plate 10 and bottom plate 20 are designed to capture the elastic cushions there between. The surfaces of the elastic cushions can be stiffened or made more flexible, using different materials or surface treatment, and only need to insure that the elastic cushions 30 work as a group to maintain support of the body cushion 90 above. The top plate 10 and bottom 20 also create an interface of support between the body support bracket 100 surface and the body cushion 90 that supports the user's head. However, one skilled in that art could appreciate that the design is not limited to that. Rather, the body cushion 90 may include an integrated top plate 10, while the body support bracket 100 may include an integrated bottom plate 20, such that the elastic cushion 30 is positionable there between to offer appropriate support and little resistance to deflection.

As the top plate 10 moves, the very supple outer sidewall 32 and filler 38 permit free movement of the top and bottom plates in all directions over a limited range. Additionally, as shown in FIG. 3, the cover 50 ensures the top plate 10, elastic cushions 30, and the bottom plate 20 are encased and protected. The stretchable side 56 allows free motion of the top plate 10 with respect to the bottom plate 20 when the elastic cushions 30 deform, since the stretchable side 56 does not impede the free movement of the top and bottom plates 10, 20 positioned there within.

The body support 1 functionally allows near frictionless movement of the user's body part, such as a head, to mover in all horizontal directions with almost no force required to initiate motion, yet provide stability and support for the neck. The body support 1 also exerts forces that increase with distance from a centered positioned, such that the elastic cushions 30 recover back to a resting position. This provides the user a desired sense of control, and allows the muscles to relax more. The body support 1 also allows motion in a vertical direction, so that the user may position their head in the most relaxed position, and then move and adjust. When forces are applied to the head or body, the device allows that force to translate into motion and repositioning of the head relative to the body, thereby minimizing stress normally put on the cervical spine in compression and muscles in the neck.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A body support, comprising:
- a moveable top plate having a first u-shaped body with a first planar surface and a first body receiving space passing through the first u-shaped body;
- a stationary bottom plate having a second u-shaped body with a second planar surface facing the first planar surface and a second body receiving space passing through the second u-shaped body and corresponding with the first body receiving space; and
- a plurality of elastic cushions disposed between and engaging the moveable top plate and the stationary bottom plate such that the moveable top plate moves about the plurality of elastic cushions independent of the stationary bottom plate.

2. The body support of claim 1, further comprising a cover disposed over the movable top plate, the stationary bottom plate, and the plurality of elastic cushions.

3. The body support of claim 2, wherein the cover includes a stretchable side having elasticity.

4. The body support of claim 3, wherein the cover further includes a top and a bottom secured to opposite sides of the stretchable side.

5. The body support of claim 4, wherein the top, the stretchable side, and the bottom define a support receiving space dimensioned to receive and surround the movable top plate, stationary bottom plate, and the plurality of elastic cushions.

6. The body support of claim 5, wherein the cover further includes a support receiving opening that opens into the support receiving space.

7. The body support of claim 6, wherein the cover further includes an attachment member providing a temporary seal of the support receiving opening.

8. The body support of claim 2, further comprising a fastener disposed on the cover.

9. The body support of claim 1, further comprising a plurality of top cushion receiving spaces disposed along the first planar surface.

10. The body support of claim 9, wherein each of the plurality of top cushion receiving spaces is a depression extending into the body from the first planar surface.

11. The body support of claim 1, further comprising a plurality of bottom cushion receiving spaces disposed along the second planar surface.

12. The body support of claim 11, wherein each of the plurality of cushion receiving spaces is a depression extending into the body from the second planar surface.

13. The body support of claim 1, wherein each of the plurality of elastic cushions includes an outer sidewall, an inner cavity, and a filler.

14. The body support of claim 13, wherein each of the plurality of elastic cushions is spherical.

15. The body support of claim 14, wherein each of the plurality of elastic cushions is capable of being elastically deformable.

16. The body support of claim 15, wherein each of the plurality of elastic cushions includes a tacky surface.

17. The body support of claim 13, wherein the outer sidewall includes an opening that leads into the inner cavity and a plug that seals the opening.

18. The body support of claim 17, wherein the filler is movable during deformation of the outer sidewall.

19. The body support of claim 18, wherein the filler is an elastomeric material that is different than a material used for the outer sidewall.

20. The body support of claim 1, wherein each of the plurality of elastic cushions is a solid member of elastic material.

21. The body support of claim 1, further comprising a body cushion removably connectable with the moveable top plate.

22. The body support of claim 21, further comprising a body support bracket removably connected to a support structure and the stationary bottom plate.

23. The body support of claim 22, wherein the body support bracket includes a support platform secured to the stationary bottom plate and a connector secured to the support structure.

24. A body support, comprising:

a moveable top plate;

a stationary bottom plate facing the moveable top plate;

a plurality of elastic cushions disposed between and engaging the moveable top plate and the stationary bottom plate such that the moveable top plate moves about the plurality of elastic cushions independent of the stationary bottom plate; and a cover having a fastener positioned on a lower surface thereof and securable to a body support bracket and a stretchable side covering the moveable top plate, the stationary bottom plate, and the plurality of elastic cushions.

* * * * *